(12) United States Patent
Ahluwalia

(10) Patent No.: US 9,798,806 B2
(45) Date of Patent: Oct. 24, 2017

(54) INFORMATION RETRIEVAL USING DYNAMIC GUIDED NAVIGATION

(75) Inventor: Ashwinder Ahluwalia, Union City, CA (US)

(73) Assignee: EXCALIBUR IP, LLC, New York, NY (US)

(*) Notice: Subject to any disclaimer, the term of this patent is extended or adjusted under 35 U.S.C. 154(b) by 1001 days.

(21) Appl. No.: 12/060,094

(22) Filed: Mar. 31, 2008

(65) Prior Publication Data
US 2009/0248666 A1 Oct. 1, 2009

(51) Int. Cl.
*G06F 17/40* (2006.01)
*G06F 17/30* (2006.01)

(52) U.S. Cl.
CPC .... *G06F 17/30864* (2013.01); *G06F 17/3064* (2013.01); *G06F 17/30867* (2013.01)

(58) Field of Classification Search
CPC .. G06F 7/36; G06F 17/2818; G06F 17/30648; G06F 17/30029; G06F 17/30867
USPC ........................................................ 707/726
See application file for complete search history.

(56) References Cited

U.S. PATENT DOCUMENTS

| | | | |
|---|---|---|---|
| 6,564,213 B1* | 5/2003 | Ortega et al. | 707/E17.074 |
| 7,809,714 B1* | 10/2010 | Smith | 707/713 |
| 7,827,110 B1* | 11/2010 | Wieder | 705/52 |
| 2003/0115191 A1* | 6/2003 | Copperman et al. | 707/3 |
| 2006/0129843 A1* | 6/2006 | Srinivasa et al. | 713/189 |
| 2006/0167864 A1* | 7/2006 | Bailey et al. | 707/3 |
| 2006/0184579 A1* | 8/2006 | Mills et al. | 707/104.1 |
| 2006/0224554 A1* | 10/2006 | Bailey et al. | 707/1 |
| 2007/0180019 A1* | 8/2007 | Woods | 709/203 |
| 2007/0288454 A1* | 12/2007 | Bolivar et al. | 707/5 |
| 2008/0313050 A1* | 12/2008 | Basir | 705/26 |
| 2009/0012833 A1* | 1/2009 | Kuhlke et al. | 705/9 |

* cited by examiner

*Primary Examiner* — Apu Mofiz
*Assistant Examiner* — Sheryl Holland
(74) *Attorney, Agent, or Firm* — James J. DeCarlo; Greenberg Traurig, LLP (57) ABSTRACT

An apparatus and method for providing relevant search result and query terms are disclosed herein. Natural language processing of the documents and previous search session history are used to dynamically determine document relevance, queries relevant to search categories prior to start of a search session, and query to query correlations.

20 Claims, 10 Drawing Sheets

TELL ME MORE »

VIEWFINDER [____] 204    CAMERAS ☑ FIND REVIEWS — 206

202  208

312 — CANON DIGITAL REBEL XT EOS 350D BODY ONLY DIGITAL CAMERA

HTTP://WWW.EPINIONS.COM/CONTENT 179145520632

306 — NOTE THAT THE LCD SCREEN DOES NOT ALLOW YOU TO PREVIEW SHOTS LIKE IN POINT-AND-SHOOT DIGITAL CAMERAS. YOU MUST USE THE [VIEWFINDER] TO FRAME AND TAKE YOUR SHOT. THE COLOR LCD IS A BIT ON THE DIM SIDE WHEN COMPARED TO MY OTHER CANON POINT-AND-SHOOT DIGITAL CAMERAS.

HTTP://WWW.EPINIONS.COM/CONTENT 226728054404

308 — THAT WAS ONE NICE THING IF YOU WANTED TO TRAVEL REALLY LIGHT IS THAT THE A80 COULD TAKE GREAT PICTURES AND FAIR QUALITY SHORT MOVIES WITH SOUND. THE SECOND IS THE ABILITY TO PREVIEW THE SHOT IN THE LCD INSTEAD OF HAVING TO USE THE OPTICAL [VIEWFINDER]. I KNOW THAT MOST SERIOUS PHOTOGRAPHERS WOULD FROWN UPON THESE TWO AMATEURISH FEATURES BUT I STILL MISS THEM.

HTTP://WWW.EPINIONS.COM/CONTENT 487940245124

302 — I WISH CANON WOULD DO SOMETHING ABOUT THIS. I ALSO DISLIKE HAVING TO TAKE MY EYES AWAY FROM THE TINY APS-SIZED [VIEWFINDER] TO LOOK AT THE LCD DISPLAY ON THE BACK TO SEE WHAT THE CURRENT SETTINGS ARE ON THE CAMERA. THE ONLY THING DISPLAYED IN THE [VIEWFINDER] LCD IS THE SHUTTER SPEED, THE APERTURE, THE EXPOSURE AND AUTOFOCUS LOCK, AND THE EXPOSURE COMPENSATION NEEDLE.

300

304 —
- %
- AUTO
- BOTTOM
- CANON
- CONS
- DIGITAL
- ISO
- IMAGE
- LCD
- LINE
- NIKON
- PROS
- QUALITY
- SD
- SLR
- USB

FROM FIG. 3A

- ANGLE
- APERTURE
- AUTO
- BALANCE
- BATTERIES
- BATTERY
- BIT
- BODY
- BUTTON

↙ 304

314 ⌐ CANON DIGITAL REBEL XT EOS 350D DIGITAL CAMERA WITH EF-S 18-55mm LENS
HTTP://WWW.EPINIONS.COM/CONTENT 178322443908
  DIGITAL SLRS DO NOT INCLUDE A STARTER MEMORY CARD -LRB- LIKE MOST P&S
DIGITCAMS -RRB- SO EOS350DVDIGITAL REBEL XT PURCHASERS MUST BUY THEIR OWN -LRB- A
512MB CF CARD IS ROUGHLY EQUIVALENT, CAPACITY WISE, TO ONE 24 EXP ROLL OF 35mm
FILM -RRB- .NUTS & BOLTS [VIEWFINDER] THE DIGITAL REBEL XT & # 146S PENTMIRROR
THROUGH-THE-LENS -LRB- TTL -RRB- OPTICAL [VIEWFINDER] IS FAIRLY BRIGHT AND COLOR
CORRECT. INSIDE THE [VIEWFINDER] ARE 7 AF FOCUSING POINTS -LRB- THE ACTIVE FOCUS POINT
-LRB- S -RRB- ARE ILLUMINATED SO SHOOTERS KNOW EXACTLY WHERE THE CAMERA IS
310 ⌐ FOCUSING -RRB- ,
HTTP://WWW.EPINIONS.COM/CONTENT 178859642500
PROS PRICE, SIZE, 8MP, FEATURES CONS NO INCLUDED COMPACT FLASH, NO ISO 3200, SMALL

| Query terms | Total occurrences in user sessions | Total occurrences in documents | Percentage of occurrences in new documents | Percentage occurrences in last week's queries | Synonyms | ... |
|---|---|---|---|---|---|---|
| megapixel | 1231230 | 199802 | 4.5 | 12 | | |
| red eye | 1231230 | 199802 | 4.5 | 12 | | |
| ... | | | | | | |

FIG. 7

| Query One | Query Two | Co-occurrence probability in documents | Average word distance in documents | Co-occurrence probability in user sessions | ... |
|---|---|---|---|---|---|
| megapixel | red eye | 4% | 20 | 6% | |
| megapixel | picture quality | 35% | 7 | 12% | |
| ... | | | | | |

INFORMATION RETRIEVAL USING DYNAMIC GUIDED NAVIGATION

CROSS-REFERENCE TO RELATED APPLICATIONS

The present application relates to U.S. patent application Ser. No. 12/060,069 filed on Mar. 31, 2008 and titled "Information Retrieval Using Dynamic Guided Navigation".

BACKGROUND

The present invention relates to information retrieval. More particularly, the present invention relates to information retrieval using dynamic guided navigation.

Information retrieval from large sets of electronic documents, such as web pages, can be achieved by searching. Often the information desired is not the documents themselves but the content in the documents. Users typically enter search queries into a search engine and then review the search results to extract the desired content. Not all users, however, know beforehand what they are searching for. Hence, searches can run the spectrum from directed searches to pure exploratory type of searches.

With directed searches, users already know what they are searching for and can formulate the search queries. For example, a user wants to know about product feature X. The user formulates a search query that includes terms such as the product name and the feature X. With exploratory searches, users may have a general subject area in mind but do not know enough about the subject area to intelligently formulate focused search queries and/or review the search results. For example, a user wants to find out interesting aspects of a product Y. However, the user knows little or nothing about aspects of product Y. Thus, the user's search query may be limited to "product Y." Such query will return a large number of documents. Not only is the large set of search result impractical to read, but even reading through the documents, it may not be clear what aspects or features of product Y are relevant.

To aid users conducting exploratory searches, some search engines provide recommendations of narrower search queries. The recommendations are generated by mining query logs from a community of users and extracting the most frequent queries that included the current user's entered query plus at least one other query term. For example, if many people search for "golf courses," then when the current user searches for "golf," one of the recommendations may be "golf courses." Although this approach draws from the knowledge of a community of users, the recommendations do not take into account the content of the corpus of documents that are being searched.

One way to make general or web searching, e.g., searching within all of the documents within the web space, more manageable is to divide the web space into sub-spaces based on the document type. Product review space is an example of a sub-space based on web sites or documents that contain product reviews. These web sites explicitly asked users to submit reviews of particular products, the review typically including a numerical ranking of the particular products.

When a user is interested in buying a digital camera, for example, he or she can look through product reviews of digital cameras to find out which particular digital camera is best suited for him. But the user is not familiar with digital cameras and does not know what makes one camera better or worse than other cameras. Thus, he is unable to formulate a direct query to find relevant reviews, such as reviews that discuss relevant features of digital cameras. Instead, the user formulates an exploratory query and is confronted with a thousand reviews of digital camera. Reading through the thousand reviews would be impractical. Instead, the user would benefit from quick navigation guidance to the most relevant reviews, e.g., only those reviews that cover the digital camera features likely to be of interest to the user.

Even if the reviews of digital cameras are sorted by numerical rankings included in the reviews, e.g., from highest to lowest rankings to surface particular digital cameras that are highest ranked, numerical rankings fail to sufficiently differentiate and identify subtleties in selecting a digital camera. For one thing, numerical rankings tend to cluster within a very narrow range. For another, numerical rankings do not take into account the substance of the reviewers' comments or opinions of why they liked or disliked a product.

Alternatively, even if a web site asks a user to self categorize, e.g., between a novice, intermediate, or expert, in order to suggest a preset (or preselected) list of features or topics for further exploration, such a preset list is not dynamic. All users who select the same category are presented the same preset list for further exploration. The preselected list is also typically not reflective of the documents contents and may merely reflect a subset of what users are talking about.

Thus, it would be beneficial to anticipate the dimensionality of the data organization for domains where exploratory searches may be common. It would be beneficial to pre-organize the data to serve as a broad summary of the corpus even before a search query is entered. It would be beneficial to provide users navigational guides to quickly access the data that they are actually interested in but unable to articulate due to lack of subject matter knowledge. It would be beneficial to incorporate past user sessions data to evolve the organization of the data and/or ranking of documents over time. It would be beneficial to cluster the organized data by predefined categories to provide targeted advertisement. It would be beneficial to cluster categories that are related to one another (because users tend to explore such categories together) to help categorize users and target advertising.

BRIEF SUMMARY

One aspect of the invention relates to a computerized method for providing dynamic information retrieval. The method includes determining relevance of documents comprising a corpus of documents relating to a search category, and obtaining degree of interest data by users in one or more document of the corpus of documents. The method further includes determining documents comprising a search result and an order of the documents comprising the search result based on the determined relevance and obtained degree of interest data, obtaining direct search query terms from the users, and identifying document query terms from the corpus of documents. The method further includes determining query to query correlations, and determining at least one query term to provide with the search result from the direct search query terms, document query terms, and the query to query correlations.

Another aspect of the invention relates to a system for providing dynamic information retrieval. The system including a query information data structure comprising occurrence and frequency data relating to each of a plurality of query terms from search queries specified by a plurality of users and natural language processing of a corpus of documents, and a query correlation data structure comprising correlation data for each pair of the plurality of query terms from query term content in the corpus of documents and degree of query term pairings specified by the plurality of users.

Still another aspect of the invention relates to a system for providing dynamic information retrieval. The system including logic operable to identify documents relating to a search category, analyze the documents to determine internal statistical content, and track users interestingness data for the documents. The system also including logic operable to identify first query terms from the documents, track second query terms specified by the users, and track users indication of interest in pairs of query terms.

Other features and aspects of the invention will become apparent from the following detailed description, taken in conjunction with the accompanying drawings which illustrate, by way of example, the features in accordance with embodiments of the invention. The summary is not intended to limit the scope of the invention, which is defined by the claims attached hereto.

BRIEF DESCRIPTION OF THE DRAWINGS

The exemplary embodiments will become more fully understood from the following detailed description, taken in conjunction with the accompanying drawings, wherein the reference numeral denote similar elements, in which.

The headings provided herein are for convenience only and do not necessarily affect the scope or meaning of the claimed invention.

DETAILED DESCRIPTION

Described in detail below is a system and method for dynamically providing search results and query suggestions based on natural language analysis of a corpus of documents and past users' session data. The past users' sessions data includes user directed search query logs, users' interest level in particular documents, and users' propensity to correlate one query term with another query term. Since the documents and user interaction may change over time, data organization and weighing of subsets of data relative to each other also changes over time. Rather than users having to run initial searches and examine certain search result documents in order to extract new search terms, initial search results automatically include the most likely relevant concepts (to a certain extent already extracted from the corpus of documents) and the relevant documents are ordered in a way most likely to be of interest to the user.

The following description provides specific details for a thorough understanding of, and enabling description for, embodiments of the invention. However, one skilled in the art will understand that the invention may be practiced without these details. In other instances, well-known structures and functions have not been shown or described in detail to avoid unnecessarily obscuring the description of the embodiments of the invention.

Figure 1:
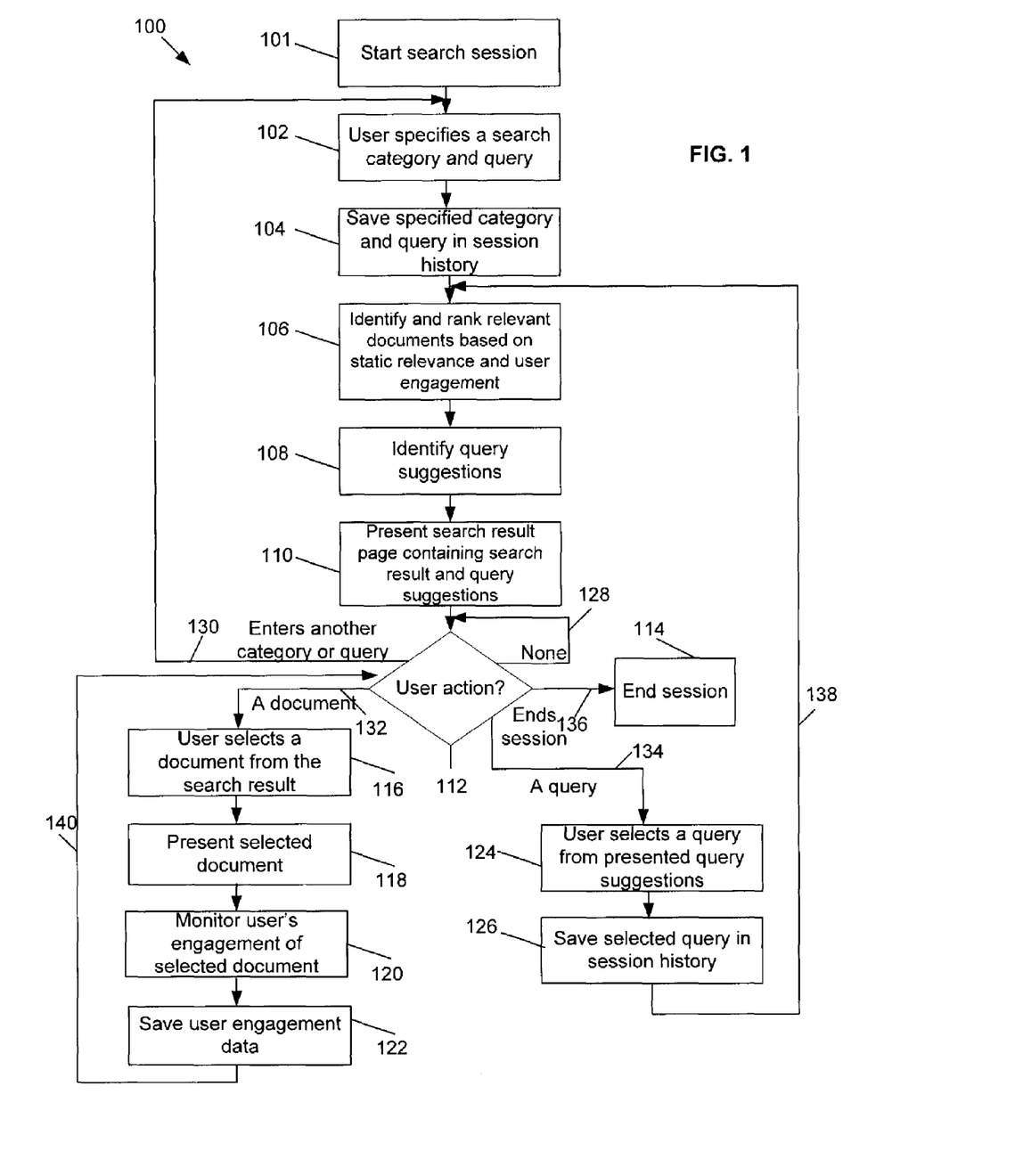
FIG. 1 illustrates a flow diagram for retrieving information using dynamic guided navigation in accordance with embodiments of the invention.

FIG. 1 illustrates a flow diagram 100 for retrieving information using dynamic guided navigation in accordance with embodiments of the invention. FIG. 1 will be described in conjunction with FIGS. 2-4. The flow diagram 100 includes a search session start block 101, a category and query specify block 102, a save into session history block 104, a search result generation block 106, a query suggestion generation block 108, a search result and query suggestions presentation block 110, a user selection check block 112, an end block 114, a document selection block 116, a selected document presentation block 118, a user engagement monitor block 120, a save user engagement data block 122, a query selection block 124, and a save into session history block 126.

To start a search session (block 101), a user interacts with a user interface associated with a document dimensionality and query correlation search engine. Such search engine may be accessed via a toolbar, a popup window, a mouse over window, an actionable icon, a URL address, and/or an application programming interface (API).

At the block 102, a user specifies a search category and a search query using a user interface associated with a document dimensionality and query correlation search engine. A list of possible search categories is presented to a user at the beginning of a search session. Once the user has chosen a category from the list of categories, a search query or term is required from the user. In one embodiment, the user can enter any query he or she desires into a query field. In another embodiment, a list of possible queries is provided to the user (based on the chosen category) and the user selects a query from the list.

Figure 2:
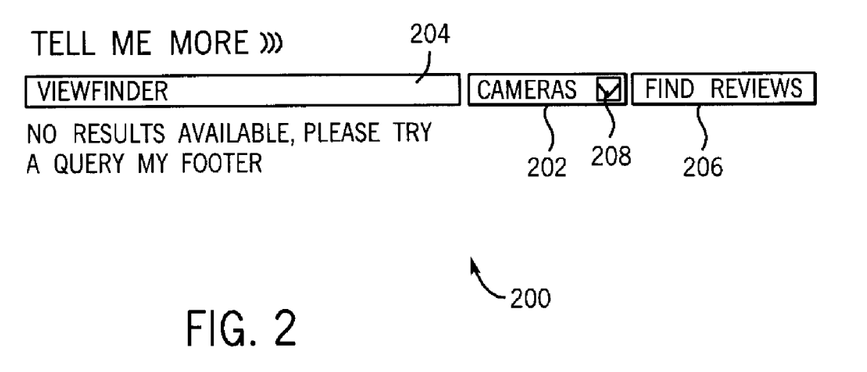
FIG. 2 is an example of a query entry page in accordance with embodiments of the invention.

In FIG. 2, an example of a search request page is shown in accordance with embodiments of the invention. A search request page 200 includes a category field 202, a query field 204, and a search initiation button icon 206. A drop down icon 208 (shown as a downward pointing arrow) is provided next to the category field 202. When the user clicks on the drop down icon 208, a list of categories is displayed below the category field 202 (not shown). In FIG. 2, the user has chosen the "camera" category from the displayed list of categories. Since FIG. 2 is an example of a search request page for product reviews, the list of categories includes, but is not limited, to a variety of products that users may be interested in purchasing such as laptops, MP3 players, printers, dryers, televisions, mixers, etc. The user has just entered the query "viewfinder" in the query field 204 but has not yet clicked on the icon 206. Hence, the page 200 contains a request to enter a query to complete the required search parameters.

Figure 3A:
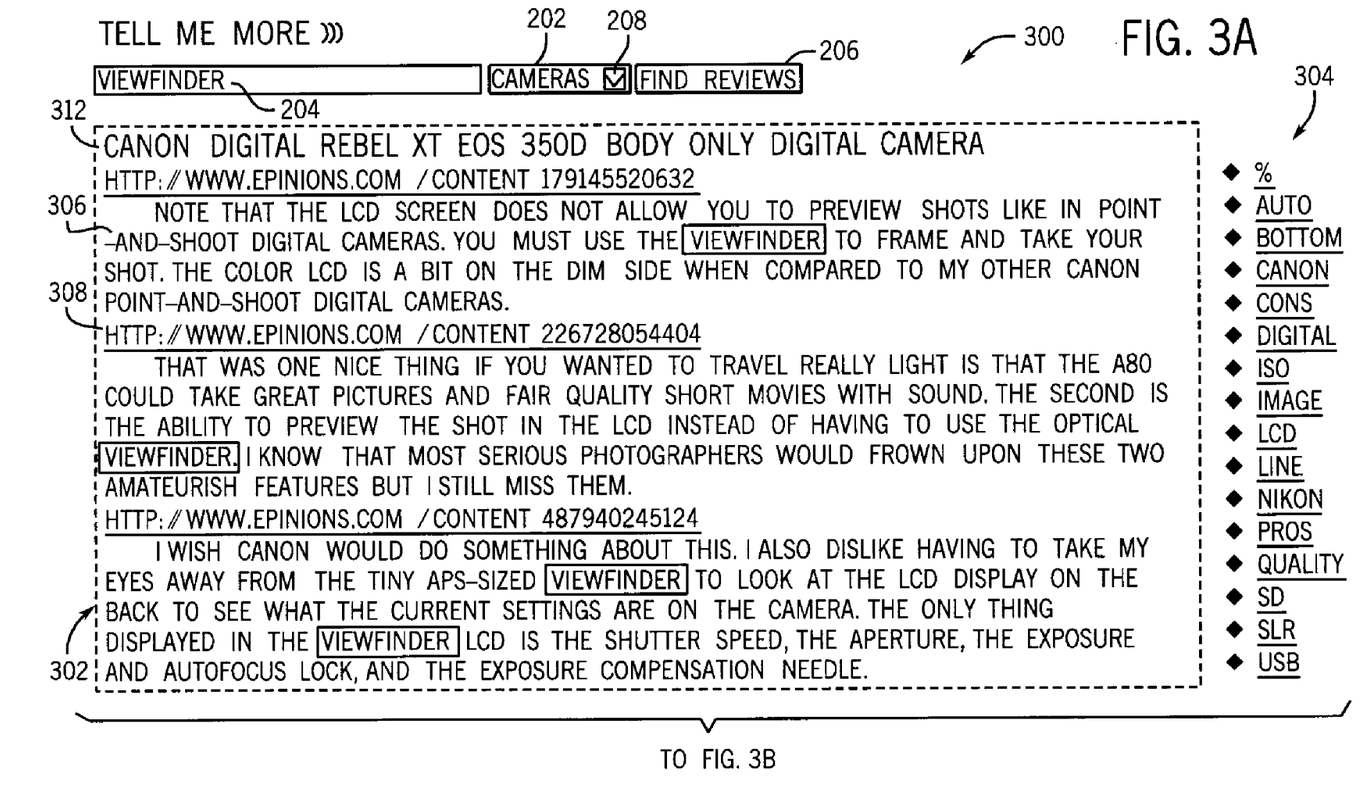
FIG. 3 is an example of a page providing search result and query suggestions in accordance with embodiments of the invention.
Figure 3B:
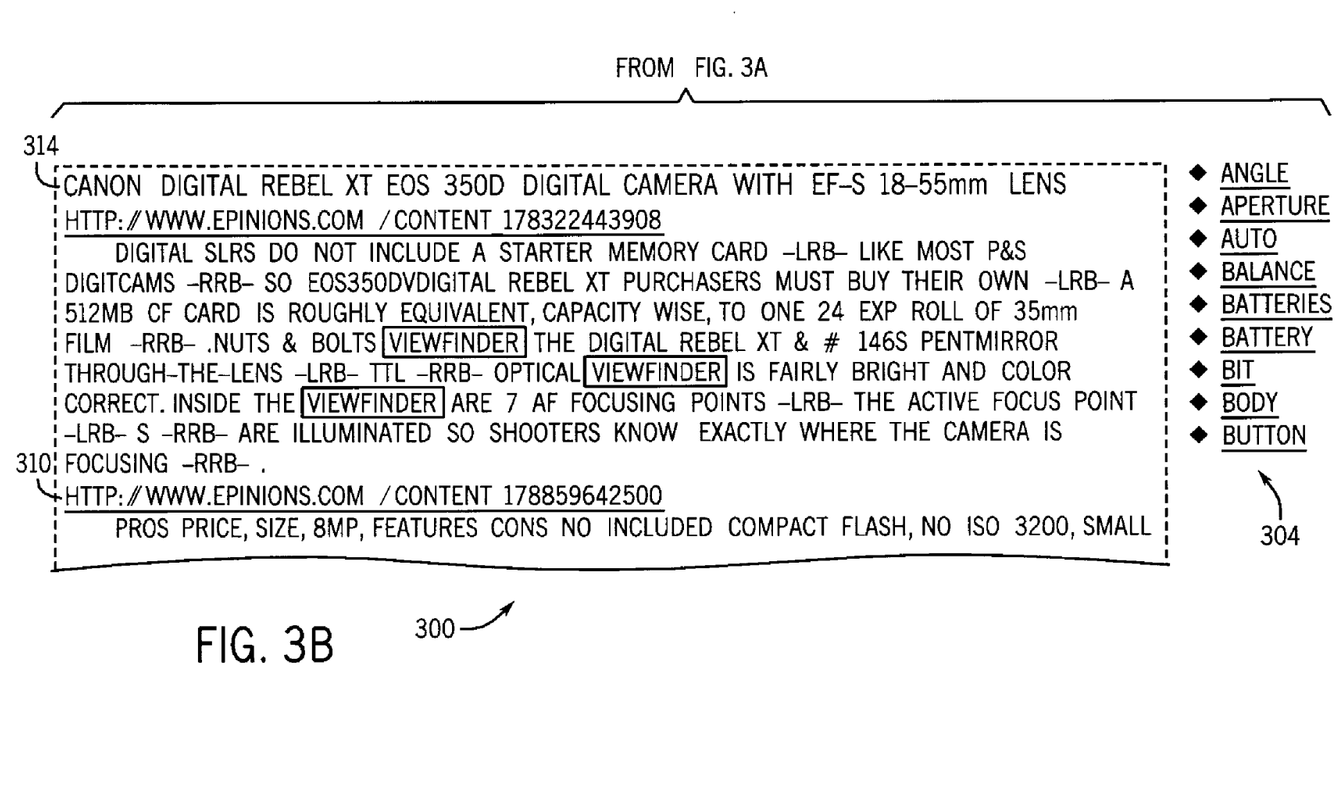
Figure 4A:
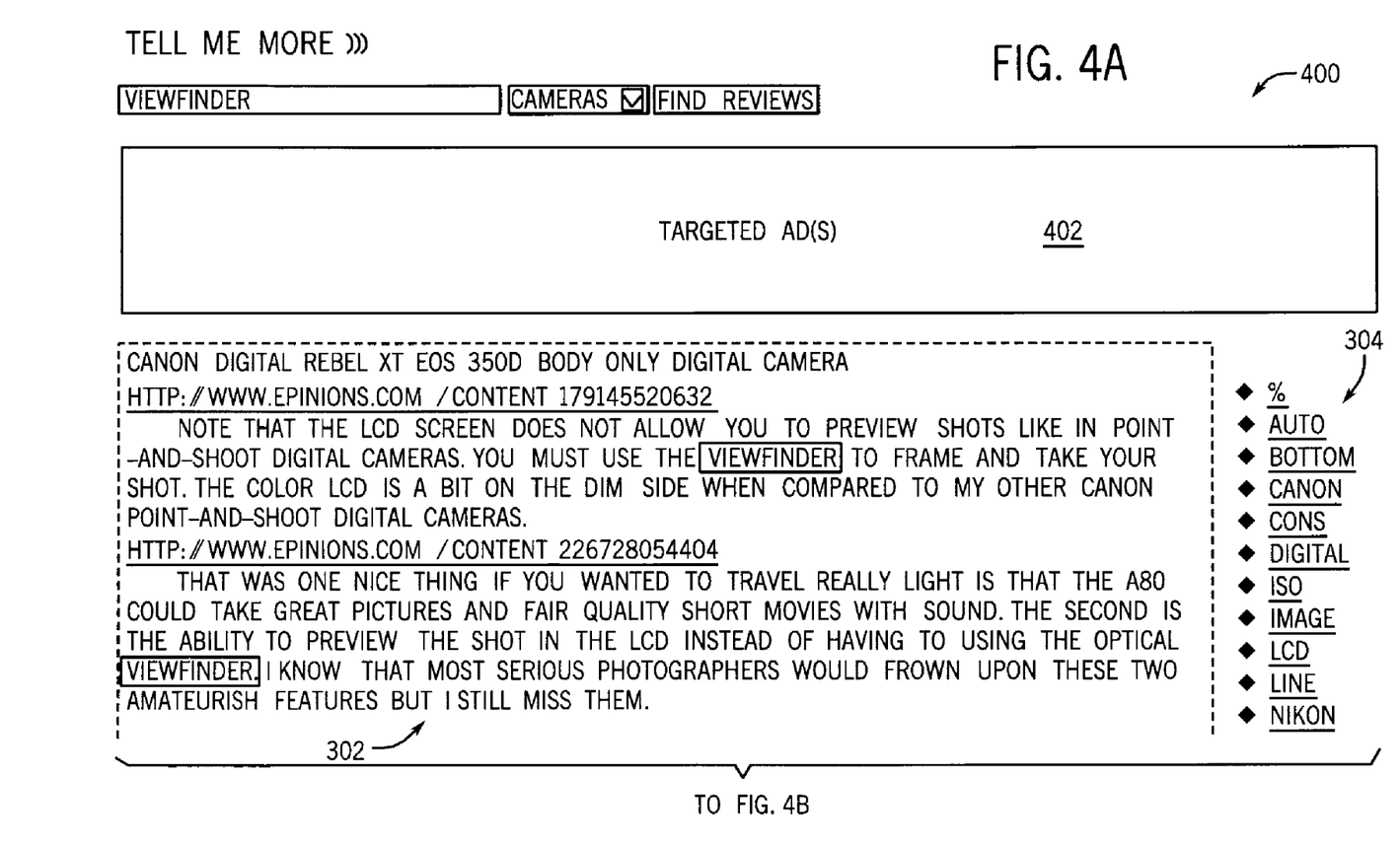
FIG. 4 is an example of another page providing search result and query suggestions in accordance with embodiments of the invention.
Figure 4B:
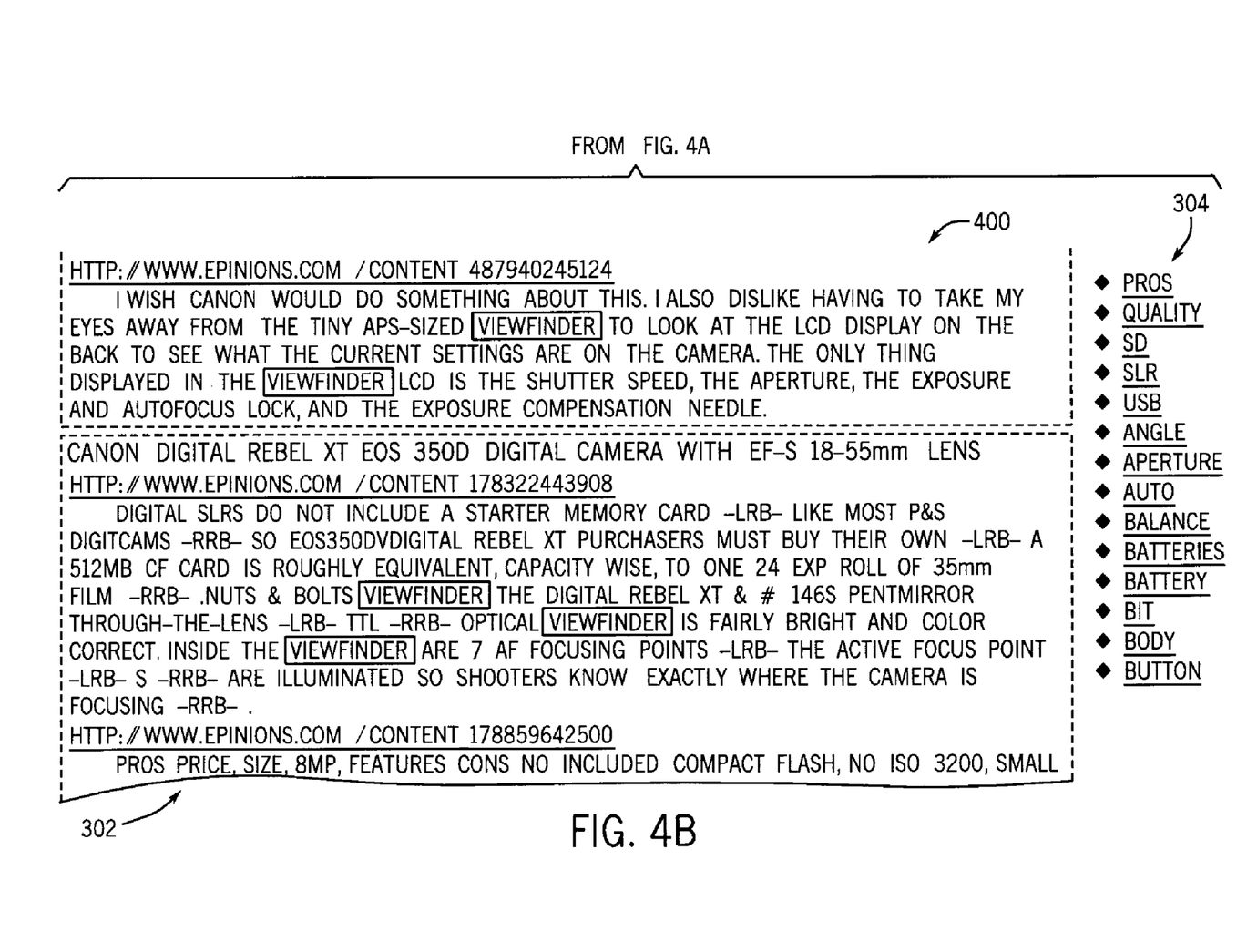

In alternative embodiments, the search request page and the user interface used to initiate a search may differ from that shown in FIGS. 2-4. For example, a category field may not be required. Instead, the user may explicitly or implicitly specify a query and the system is operable to infer a category based on the user query. When a user inputs "canon powershot," the system may be able to infer that the product category is camera. In alternative embodiments, the search results may be presented differently from that shown in FIGS. 3-4. For example, rather than ranking documents by relevance, the documents may be displayed by date, alphabetical order, or some other static order and its relevance denoted by a certain font, text highlight, or other textual differentiation from the rest of the text. As another example, the relative relevance of a document may be conveyed using tag clouds.

Next in the block 104, the chosen category and query are saved as user session data in session history. Capture of session data can be accomplished using cookies. The user need not be uniquely identified, such as having the user log in, prior to running a search.

With the search parameters specified, the search result and query suggestions are computed or determined in the blocks 106 and 108. Although the block 108 is shown following the block 106, it is contemplated that block 108 can be before block 106 or both of the blocks 106, 108 can occur simultaneously. It is also contemplated that one or more additional blocks can be included between blocks 104 and 110, such as a block to generate targeted advertisements. In the block 106, the documents comprising the search result are selected and ranked relative to each other in preparation of display to the user. The static relevance of the content of the documents and data collected regarding a plurality of users interacting with the documents are used to determine the relevance of the documents. In the block 108, query suggestions are generated in preparation of display to the user. Session history and query predictor data are used to determine the query suggestions.

At the block 110, the calculated search result and query suggestions (and any other information such as targeted advertisement) are displayed in a search result page. FIG. 3 illustrates an example of a search result page in accordance with embodiments of the invention. A search result page 300 repeats the category field 202, query field 204, and search initiation icon 206 from the search query page 200. The "viewfinder" query and "camera" category from FIG. 2 are also displayed in the search result page 300. The search result page 300 also includes a search result component 302 and a query suggestions component 304. The search result component 302 comprises a list of the documents found relevant to the user entered category and query, the documents listed in order of highest to lowest relevance. Each listed document 306, 308, 310 includes a URL address (or other unique identifier to access the document) and an excerpt showing where the query term is contained within the document. Each listed document 306, 308, 310 may include additional information relating to the document, such as the price, price range, retailers, extracted numerical ranking, etc. The search result component 302 can be divided into one or more subcomponents rather than it being one continuous list of documents, such as by particular camera models 312, 314. The documents are grouped by the respective subcomponents and ordered by relevance within the respective subcomponents. For example, the listed documents 306 and 308 are reviews about the camera model 312 while listed document 310 is a review about the camera model 314. Moreover, listed document 306 is more relevant than listed document 308 with respect to the camera model 312.

The query suggestions component 304 comprises a list of actionable terms that the user can choose from to initiate the next search. As discussed in detail below, the terms are those deemed to be the best correlation to the current query. The query suggestions component 304 can be provided next to the search result component 302 in a two column format. Alternatively, the query suggestions component 304 can be displayed above, below, to the left, or interspersed with the search result component 302.

FIG. 4 illustrates an alternative search result page 400. The search result page 400 is similar to the search result page 300 shown in FIG. 3. However, the search result page 400 further includes an advertisement component 402. The advertisement component 402 displays one or more targeted advertisements. The targeted advertisements are chosen in accordance with the user specified category and query. The targeted advertisement may comprise graphics, text, audio, video, or other video and/or audio information. Examples of targeted advertisement include, but are not limited to, coupons for local stores that carry the item of interest to the user with possible mini-maps, links to the manufacturer's website, or links to other products relating to the item of interest to the user (such as accessories, etc.).

Once the search result page is presented to the user, the user's response is monitored at the block 112. The user could read the search result page, enter a different category or query into the search fields, select a document listed in the search result page, select a term from the query suggestions, or end the search session. If the user has not taken any explicit action in response to the search result page (other than scrolling the page), then checking for a user response continues (branch 128). If the user specifies a new category and/or query into the category field or query field (branch 130, block 102), then the new search parameters are saved in session history (block 104) and a new search result page is generated and displayed (blocks 106, 108, 110). If the user clicks on a document from the search result page (branch 132, block 116), then the selected document is provided to the user in the block 118. The selected document can be displayed in a new window or may replace the search result page. If the user clicks on a term from the query suggestions (branch 134, block 124), then the selected query is saved in session history (branch 138, block 126) and a new search result page is determined and displayed to the user (blocks 106, 108, 110). Lastly, if the user closes the search result page (or otherwise takes action to indicate ending the search session) (branch 136), then the search session is ended at the block 114.

When the user indicates interest in a document listed in the search result component of the search result page (block 116), the user's engagement or interaction with the document is monitored after the document has been provided to the user at the block 120. The user's interaction with the document is saved as user engagement data at the block 122. Then monitoring of the user's next action continues at the block 112 (branch 140).

Figure 5:
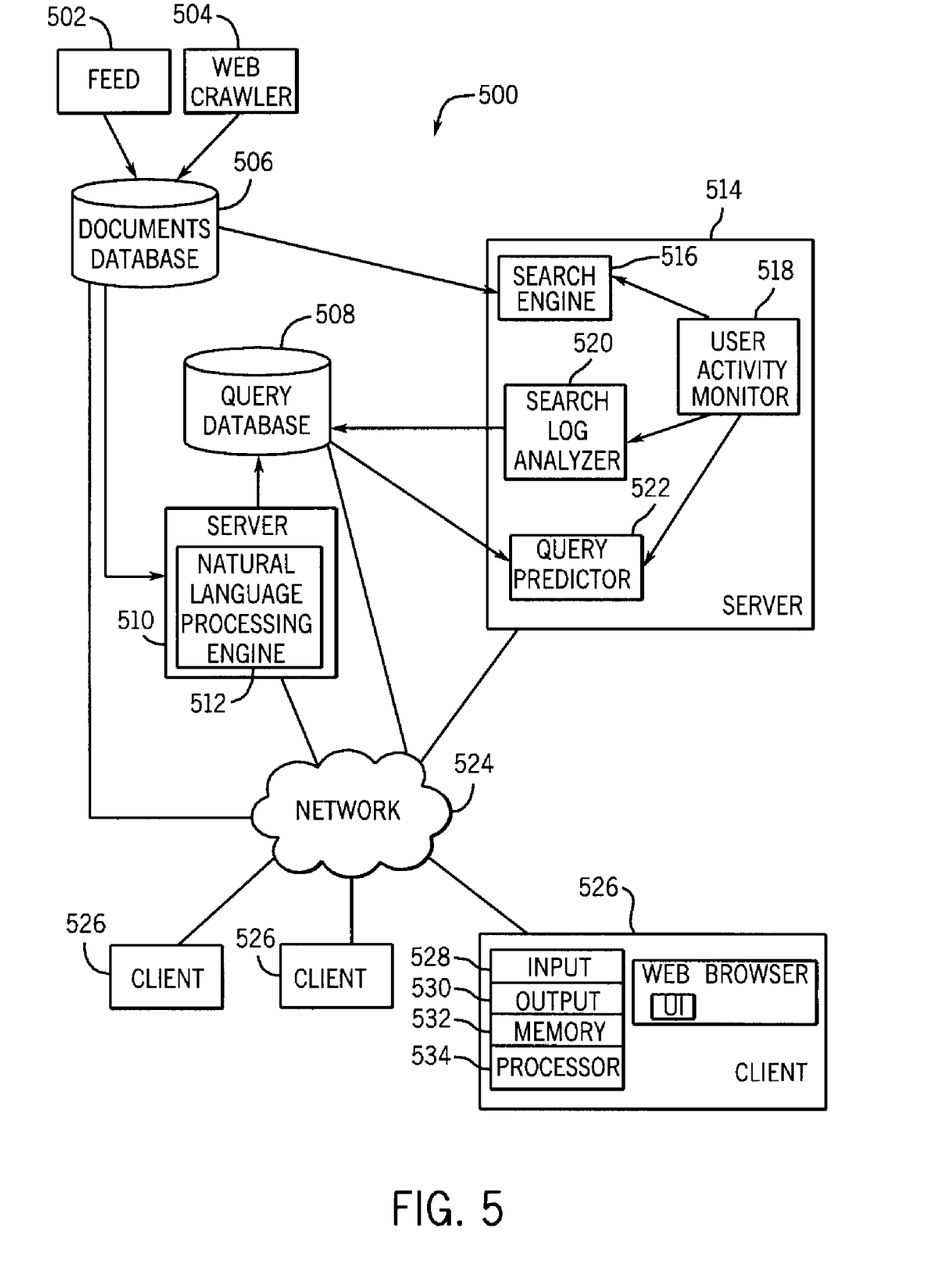
FIG. 5 illustrates a block diagram of a system for performing the information retrieval shown in FIG. 1.

FIG. 5 illustrates a block diagram of a system 500 for performing information retrieval using dynamic guided navigation in accordance with embodiments of the invention. The system 500 includes one or more web feed 502, a web crawler 504, a documents database 506, a query database 508, a server 510, a server 514, a network 524, and a plurality of clients 526. Each of the documents database 506, query database 508, server 510, server 514, and plurality of clients 526 is in communication with the network 524.

Each of the clients 526 includes an input device 528, an output device 530, a memory 532, and a processor 534. Each of the clients 526 may be a general purpose computer (e.g., personal computer) or other computer system configurations, including Internet appliances, hand-held devices, wireless devices, portable devices, wearable computers, cellular or mobile phones, portable digital assistants (PDAs), multi-processor systems, microprocessor-based or programmable consumer electronics, game consoles, set-top boxes, network PCs, mini-computers, and the like. Each of the clients 526 includes one or more applications, program modules, plug-ins, and/or sub-routines. As an example, the clients 526 can include a web browser application (e.g., Internet Explorer, Firefox, etc.), Abode Flash Player, media player (e.g., Windows Media Player), and a graphical user interface (GUI) to access web sites, web pages, or web-based applications provided by the server 514 and data stored in the databases 506, 508. The clients 526 may be located geographically dispersed from each other, the server 514 and/or the databases 506, 508. Although three clients 526 are shown in FIG. 5, more or less than three clients may be included in the system 500.

The network 524 comprises a communications network, such as a local area network (LAN), a wide area network (WAN), or the Internet. When the network 524 is a public network, security features (e.g., VPN/SSL secure transport) may be included to ensure authorized access within the system 100.

Each of the web feed 502 and the web crawler 504 is used to collect or accumulate a corpus of documents into the documents database 506. The web feed 502 comprises subscription feeds such as Really Simple Syndication (RSS). The web crawler 504 comprises one or more web crawlers and/or spiders that identifies and collects documents available on the World Wide Web, as is known in the art. The web crawler 504 also refreshes or updates content collected, as appropriate to keep up with changes on the Web. Although not shown, the web feed 502 and the web crawler 504 can be in communication with the network 524. The web feed 502 and the web crawler 504 are configured to seek documents or web pages targeted to the search type.

For example, if product reviews is the search type, then documents populating the documents database 506 are from review web sites. As another example, if the search type is directed to questions and answers information, then documents populating the documents database 506 are from questions and answers web sites (such as "answers.yahoo.com"). In generally, any informational space that has a set of documents containing focused content may be included in the documents database 506. The type of author of the documents is not that relevant. Instead, the context and content of the documents should be such that the subject matter(s) of the documents should be recognizable. For example, it would be difficult to extract the subject of every sentence in a novel and determine the overall focus (or the dominant focuses) of the novel. In contrast, product reviews are focused documents because it is possible to extract the subject or focus of each product review, such as the product (e.g., camera, MP3 player, etc.), product feature(s), and in some cases the product model, and the authors are unlikely to write about unrelated topics.

The documents in the documents database 506 comprise an index of web pages, links to web pages, data representing at least portion of the content of web pages, etc. Classification and ranking of documents within a hierarchical structure and various page indexing implementations and formats are known in the art. The documents database 506 may be periodically or continually updated. The documents database 506 may be maintained off-line or in real-time at each search request.

The documents associated with the documents database 506 are processed by a natural language processing engine 512 included in the server 510. Such processing may be performed off-line or in real-time. The natural language processing engine 512 is operable to extract the subject of every sentence within each document. Extraction of the subject occurs using natural language, sentence structure, and/or identification of the document writer's strong opinions or emotions toward a particular subject. Statistics about the extracted subjects (e.g., frequency of occurrence or strength of opinion/emotions) are used to determine whether the extracted subjects are likely to be a query of interest to users. Those subjects that meet the criteria are stored as query terms in the query database 508. For example, in the context of product review documents, the natural language processing engine 512 identifies what product features or qualities the users are writing about. Such product features or qualities would not be apparent from a review consisting of a numerical ranking.

The databases 506, 508 are operable to store data provided by and/or used by the servers 510, 514 and/or clients 526. The servers 510, 514 are operable to provide content, web-based applications, user interfaces, web pages, process data, and perform user tracking functionalities with respect to each of the clients 526 via the network 524.

The server 514 includes a search engine 516, a user activity monitor 518, a search log analyzer 520, and a query predictor 522. Each of the search engine 516, user activity monitor 518, search log analyzer 520, and query predictor 522 may comprise separate subsystems, modules, components, logic units, and the like within the server 514, or may be integrated with each other. The user activity monitor 518 is operable to monitor or track user activity at the user interface, particularly the user's interaction with each search request page, search result page, and documents selected from the search result page. The user activity monitor 518 may monitor user activity via cookies (or other appropriate plug-ins) at the clients 526.

The user activity monitor 518 tracks at least three types of user activity for each user: (1) the category and search term specified by the user in the search request page (also referred to as the directed search query), (2) the user interaction with each document clicked through from the search result page (also referred to as document interestingness), and (3) the query selected by the user from the query suggestions provided in the search result page (also referred to as query clustering or correlation). Since the user activity monitor 518 tracks each user's activity, over time session history develops for both past users and the current user. Session history may also be referred to as session data or user activity data. Session history may be stored in the server 514, databases 506, 508, and/or a separate database (not shown).

Directed search queries are provided from the user activity monitor 518 to the search log analyzer 520 to determine or mine the most common free form queries for each category from the plurality of users. These mined common queries from the search log analyzer 520 and the extracted subjects from the natural language processing engine 512 are the sources used to construct the query universe in the query database 508. The query universe comprises a set of possible queries that users might be interested in searching for a given category in a search session. The search log analyzer 520 may operate offline.

When a current user enters a category and query term into the search request page, the search engine 516 uses the tracked document interestingness of past users (from the user activity monitor 518) along with the documents indexed in the documents database 506 to generate a search result (e.g., a list of relevant documents ordered by relevance). For example, the search result component 302 in FIG. 3. At the same time, the query predictor 522 cross-correlates the query universe (from the query database 508) with queries selected from the query suggestions by past users (from the user activity monitor 518) to compute a probability for each query within the query universe likely to be of interest given the current user's entered query. These probabilities are used to determine which queries should be presented as query suggestions. For example, the query suggestions component 304 in FIG. 3. The server 514 transmits the calculated search result and query suggestions to the current user at one of the clients 526 via the network 524.

Servers 510 and 514 may comprise a single server. Alternatively, each of servers 510 and 514 may comprise more than one server, depending on computational and/or distributed computing environments. Servers 510 and 514 may be located at different geographic locations relative to each other. Similarly, databases 506 and 508 may comprise a single database or each a plurality of databases, depending on computational and/or distributed computing environments. Databases 506 and 508 may also be located at different geographic locations relative to each other and to the servers 510, 514.

In certain embodiments, at least one of the servers 510, 514 may include at least one of the databases 506, 508, processors, switches, routers, interfaces, and/or other components and modules. The databases 506, 508 may be accessed by the servers 510, 514 via the network 524 rather than by direct connection to the servers 510, 514. The system 500 may be comprised of multiple (interconnected) networks such as local area networks or wide area networks.

Although not shown as a separate component, the server 514 can include one or more modules directed to advertisement generation and/or storage. Advertisement may be provided from the query predictor 522. Query to query correlation carried out by the query predictor 522 allows the system 500 to identify query clusters. Each query cluster may be associated with a certain type of users. Each type of users may be served different targeted advertisement from other types of users. For example, users that search on (or navigate to) queries such as "megapixel" or "zoom" may be camera novices, while those that focus on "viewfinder" or "purple fringing" may be camera experts. Accordingly, if the current user enters or navigates to "megapixel," then the current user is identified as a camera novice and an advertisement(s) for basic digital cameras may be provided. If the current user enters or navigates to "viewfinder," then the current user is identified as a camera expert and an advertisement(s) for professional photography equipment may be provided.

The server 514 may include a database, or the system 500 may include a separate database in communication with the server 514, containing data to identify the types of users. In the simplest form, the database may include a list of query terms for each product with each of the query terms designated as being associated with a particular type of user (novice, intermediate, advanced, etc.). Periodically, an analysis of the data in the query database 508 can be performed to identify clusters of similar queries (e.g., find a group of queries that have relatively high co-occurrences). These clusters can then be saved in an another system or database (or within the query database 508) to facilitate user characterization/typing and subsequent targeting of query suggestions and/or advertisement.

Search results and query suggestions discussed herein do not require users to be uniquely identified by the system, e.g., users need not log in, although cookies or other (anonymous) user activity information is tracked. However, if users are uniquely identifiable, such data could further enhance their search sessions. For example, certain query suggestions may be presented to an identified user as soon as he or she has specified a search category, based on saved information about the user's previous search session(s) (such as the user having been identified as a camera expert). As another example, longer term permanent history can be maintained for users who log in, including saved search results, notes, tags, or other unique document metadata that could subsequently be fed back to the database(s) to improve relevance.

Figure 6:
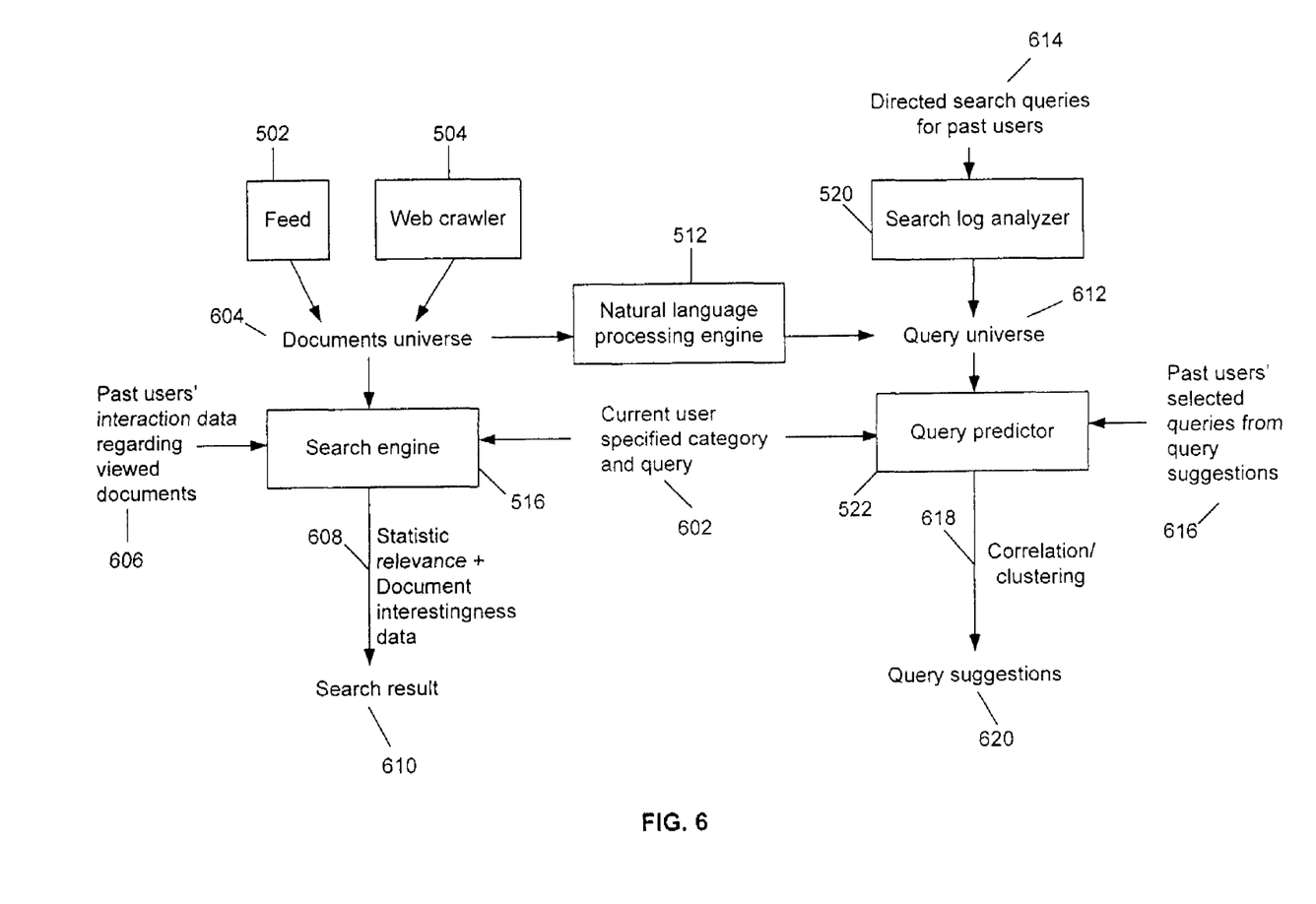
FIG. 6 illustrates a diagram showing generation of search result and query suggestions in accordance with embodiments of the invention.

FIG. 6 illustrates a diagram showing generation of search results and query suggestions in accordance with embodiments of the invention. When a current user enters a category and query term 602, the system 500 draws from a number of data sources to perform computations in order to provide search result 610 and query suggestions 620 to the current user.

A potential documents universe 604 is configured from data associated with the web feed 502 and web crawler 504. The documents universe 604 is stored in the documents database 506. Each document included in the documents universe 604 may be ranked (or otherwise annotated) based on its inherent characteristics or content. For example, the number of times the term "viewfinder" is mentioned in a camera review document may determine its ranking relative to another camera review document that contains fewer instances of the term "viewfinder." Such ranking or relevance may be referred to as the document's statistic or static relevance. The documents universe 604 is an input to the search engine 516 included in the server 514.

Another input to the search engine 516 comprises documents interestingness data 606. Documents interestingness data 606 comprises session history regarding past users interaction with particular documents included in the documents universe 604. In addition to monitoring which documents were selected by users from search result pages, the type and degree of interest expressed by users in the selected documents are monitored to obtain a measure of users' interest level in particular documents. Users' interest level in a given document may be gauged, for example, by measuring the amount of time a user spends viewing the document, measuring how "fast" a user read the document using metrics such as page scroll speed and average reading time based on length of document, click through from the selected document to other documents, whether the user bookmarked/saved the content, whether the user chose to cut and paste a portion of the content for further reading, etc.

Based on the current user's entered category and query term 602, documents universe 604, and documents interestingness data 606, the search engine 516 dynamically computes contextual ranking of documents comprising the search result 610. In certain embodiments, a coefficient or weight may be prescribed to each of the documents universe 604 and documents interestingness data 606 to combine the two data sources. It is contemplated that as the amount of user session data increases, the impact of the documents interestingness data 606 may outweigh the statistic relevance from the documents universe 604. Over time, even if another user enters identical category and query term 602 in a subsequent search session, the search result 610 may be different due to the dynamic nature of the documents universe 604 and/or documents interestingness data.

For example, if the current user's entered category and query term 602 is "camera" and "viewfinder," respectively, all documents in the documents universe 604 that satisfy these criteria comprise the search result 610. Moreover, the ranking of these documents relative to each other within the search result 610 may be affected by the documents interestingness data 606. If many users who ran the same search clicked on (and fully read) a certain document, such document would ranker higher than it otherwise would based on its statistic relevance for future users who run the same search. The contextual content of the documents as well as actual interest in the documents from a community of users are used to provide a more meaningful search result.

To generate query suggestions 620, a potential query universe 612 is configured from the documents universe 604 by the natural language processing engine 512. The query universe 612 is stored in the query database 508. User session data of searches run by past users are also used to populate the query universe 612. Directed search query logs 614 from past users are mined to extract common query terms. Continuing the example, either or both the natural language processing engine 512 or directed search query logs 614 should reveal that "viewfinder" is a feature pertaining to cameras, and thus "viewfinder" is a query term included in the query universe 612 for the camera category. In alternative embodiments, one of the common extracted subjects from the documents universe 604 or directed search query logs 614 may be used to configure the query universe 612. Moreover, the query universe 612 can be refined such as collapsing the number of query terms taking into account synonyms or other terminology usage. For example, "shutter speed" and "shutter lag" are interchangeable terms for cameras.

Once the potential universe of query terms that users may be interested in has been established, the query universe 612 is put through the query predictor 522 to increase contextual relevance. In order to identify the relevant query terms, limit the number of query terms, and/or to rank the query terms relative to each other in the query suggestions 620, the query predictor 522 also uses user session data pertaining to past users' selection of query term(s) from query suggestions provided to them relative to their entered category and query terms. Such selected queries 616 (also referred to as query navigation in user search sessions) allows the query predictor 522 to determine query clusters or correlations to provide navigationally iterative query refinement.

For example, if past sessions indicate that users searching for "aperture speed" often click on "purple fringing," then a query correlation between query terms "aperture speed" and "purple fringing" may be assumed. Then if a current user runs a search for "aperture speed," "purple fringing" should be a query term included in his or her query suggestions (and possibly vice versa if a search is initiated for "purple fringing"). Additionally, the system 500 may be able to determine (from use of the natural language processing engine 512, analysis of the query correlation data, and/or other sources) that "purple fringing" is an advanced camera feature or a feature that only camera experts are likely to be interest in. Thus, for the current user running a search on "aperture speed" or "purple fringing," the system 500 may consider such user a potential camera expert and provide advertisement targeted to camera experts (rather than novice camera users) in the advertisement component 402 (see FIG. 4) such as a powerful photo editing software.

In this manner, the query suggestions 620 provided to the current user exposes the dimensionality of what the user is actually searching and the system 500 is capable of predicting what aspects of the category (e.g., features in the case of cameras) the user might click on next. Such query prediction allows iterative query refinement and exploration during a search session by the current user. Even if the user does not know what search term(s) will yield documents of most interest to him or her, the system intelligently draws from document content and search session activity from a plurality of users to dynamically formulate the organizational structure of the search results in a way that would be most meaningful to the present search session.

In certain embodiments, the documents universe 604 comprises a subset of all documents available on the World Wide Web. The query universe 612 correspondingly also tends to be smaller than all possible search terms. Such factors make query to query correlation determinations, query clustering, targeted advertisement, and calculation of meaningful candidate query terms feasible.

By anticipating the dimensions into which to split and organize the data at the onset of a search session, users can navigationally access data they are interested in with actionable query refinement links. By knowing beforehand the dimensionality of the data (e.g., all the camera features that users are writing about), it is possible to predict which data aspect users might click on next and rank documents based on potential user interest level.

Figure 7:
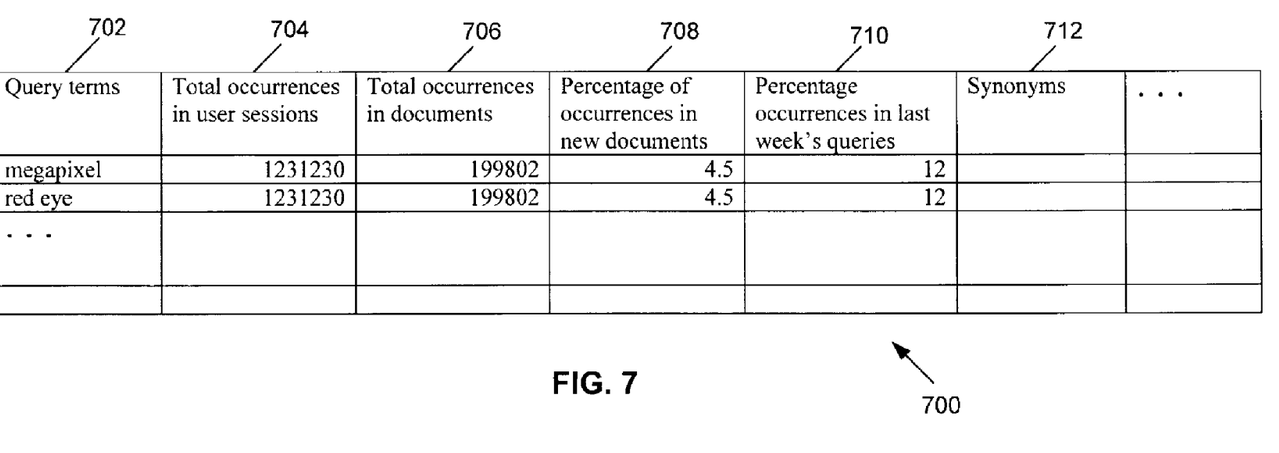
FIG. 7 illustrates a representation of a data structure in accordance with embodiments of the invention.
Figure 8:
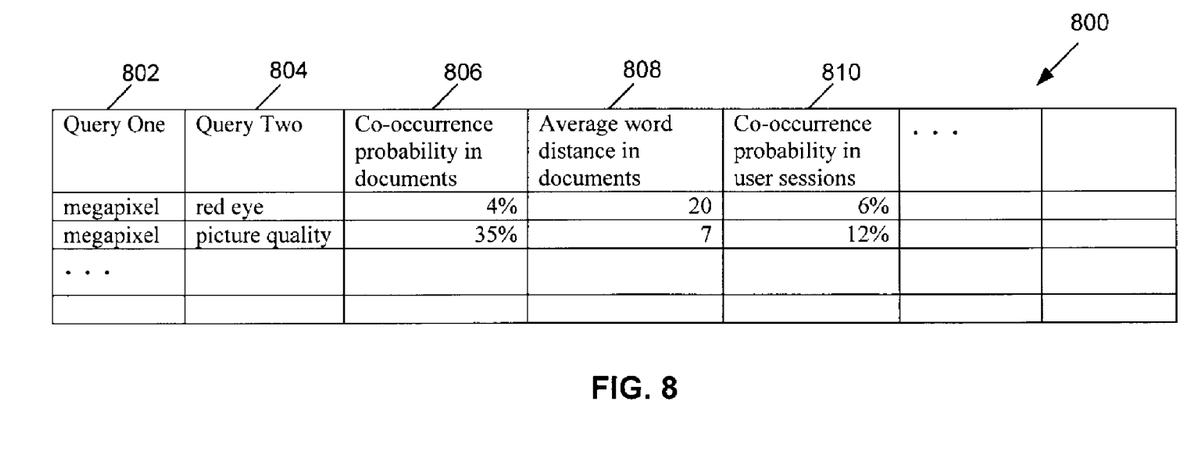
FIG. 8 illustrates a representation of another data structure in accordance with embodiments of the invention.

FIGS. 7-8 illustrate representations of data structures in accordance with embodiments of the invention. In FIG. 7, a data structure 700 (also referred to as a query properties data structure), which may be included in the query database 508 and/or other database, is configured to hold information about each query identified from the corpus of documents and user sessions. Each query is represented by a row or entry in the data structure 700. For each query (field 702), various query properties are provided such as, but not limited to, information about popularity of the query in user sessions (field 704), popularity of the query in the documents (field 706), the proportional popularity of the query in new documents added to the World Wide Web relative to a certain previous time point (field 708), the proportional popularity of the query in recent user sessions (field 710), synonyms (field 712), and/or the like. Many other query properties may also be maintained, such as proportional popularity of the query for different time periods (e.g., a day, a week, ten days, a month, etc.) or classification of the type of user. Having data relating to new documents discovered on the Internet or new queries facilities detection of suddenly popular features, products, or product models.

In FIG. 8, a data structure 800, which may be included in the query database 508 and/or other database, is configured to provide information about the co-occurrence or relationship between pairs of queries. The relationship information for each pair of queries (fields 802, 804) can include, but is not limited to, the probability that both queries appear in the same document (field 806), an average word distance in the documents containing both queries (field 808) (average word distance provides a relatively fast measure of relatedness), the probability that both queries occur in the same user session (field 810), and/or other metrics pertaining to the relationship between the pairs of queries. The query correlation data provided by the data structure 800 may include other query correlation properties to facilitate popular features, products, trends, or product models.

Figure 9:
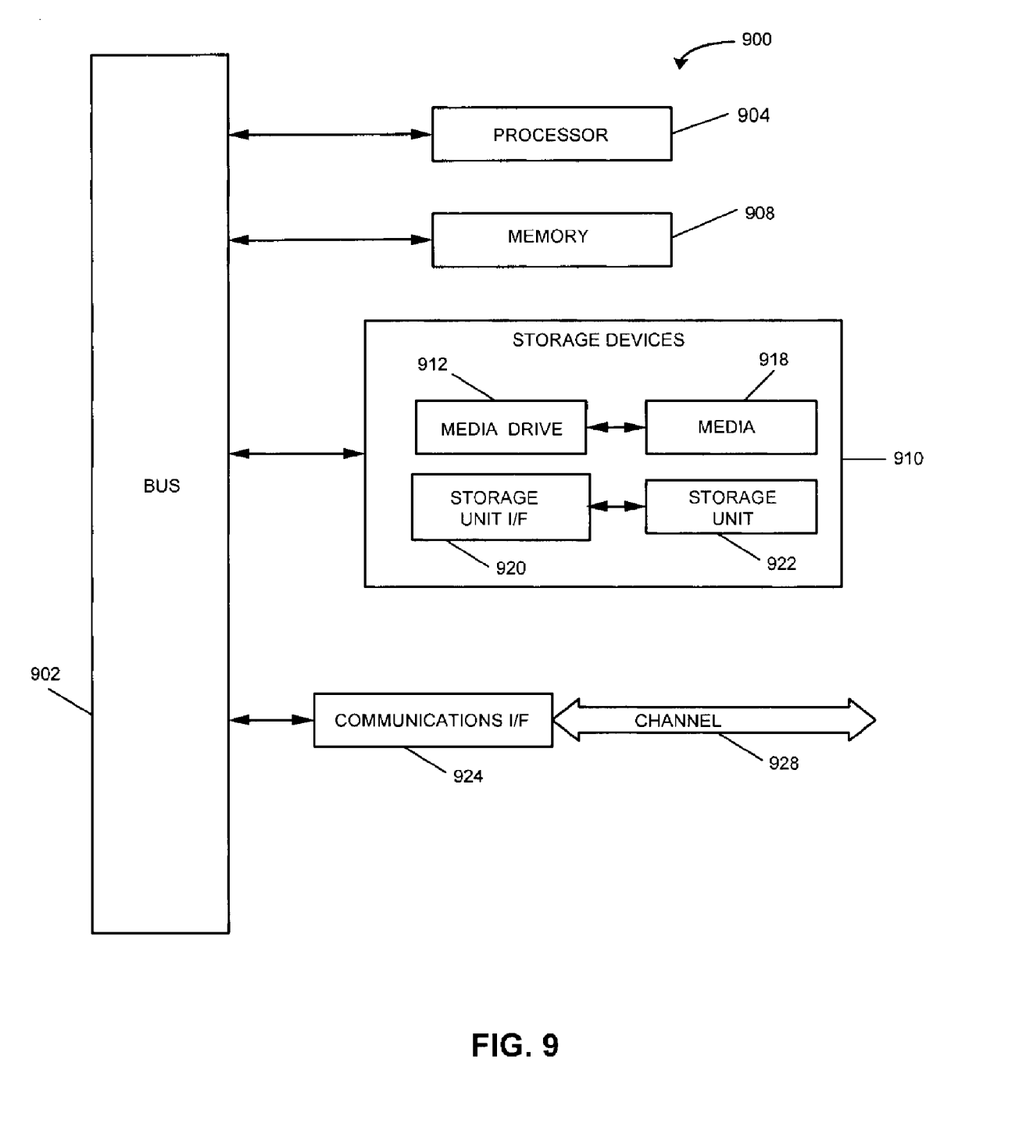
FIG. 9 illustrates a computing system that may be employed to implement processing functionalities in accordance with embodiments of the invention.

FIG. 9 illustrates a typical computing system 900 that may be employed to implement processing functionality in embodiments of the invention. For example, computing systems of this type may be used in clients and servers. Those skilled in the relevant art will also recognize how to implement the invention using other computer systems or architectures. Computing system 900 may represent, for example, a desktop, laptop or notebook computer, hand-held computing device (PDA, cell phone, palmtop, etc.), mainframe, server, client, or any other type of special or general purpose computing device as may be desirable or appropriate for a given application or environment. Computing system 900 can include one or more processors, such as a processor 904. Processor 904 can be implemented using a general or special purpose processing engine such as, for example, a microprocessor, microcontroller or other control logic. In this example, processor 904 is connected to a bus 902 or other communication medium.

Computing system 900 can also include a main memory 908, such as random access memory (RAM) or other dynamic memory, for storing information and instructions to be executed by processor 904. Main memory 908 also may be used for storing temporary variables or other intermediate information during execution of instructions to be executed by processor 904. Computing system 900 may likewise include a read only memory (ROM) or other static storage device coupled to bus 902 for storing static information and instructions for processor 904.

The computing system 900 may also include information storage system 910, which may include, for example, a media drive 912 and a removable storage interface 920. The media drive 912 may include a drive or other mechanism to support fixed or removable storage media, such as a hard disk drive, a floppy disk drive, a magnetic tape drive, an optical disk drive, a CD or DVD drive (R or RW), or other removable or fixed media drive. Storage media 918 may include, for example, a hard disk, floppy disk, magnetic tape, optical disk, CD or DVD, or other fixed or removable medium that is read by and written to by media drive 912. As these examples illustrate, the storage media 918 may include a computer-readable storage medium having stored therein particular computer software or data.

In alternative embodiments, information storage devices 910 may include other similar components for allowing computer programs or other instructions or data to be loaded into the computing system 900. Such components may include, for example, a removable storage unit 922 and a storage unit interface 920, such as a program cartridge and cartridge interface, a removable memory (for example, a flash memory or other removable memory module) and memory slot, and other removable storage units 922 and interfaces 920 that allow software and data to be transferred from the removable storage unit 918 to the computing system 900.

Computing system 900 can also include a communications interface 924. Communications interface 924 can be used to allow software and data to be transferred between computing system 900 and external devices. Examples of communications interface 924 can include a modem, a network interface (such as an Ethernet or other NIC card), a communications port (such as for example, a USB port), a PCMCIA slot and card, etc. Software and data transferred via communications interface 924 are in the form of signals which can be electronic, electromagnetic, optical, or other signals capable of being received by communications interface 924. These signals are provided to communications interface 924 via a channel 928. This channel 928 may carry signals and may be implemented using a wireless medium, wire or cable, fiber optics, or other communications medium. Some examples of a channel include a phone line, a cellular phone link, an RF link, a network interface, a local or wide area network, and other communications channels 928 to perform features or functions of embodiments of the invention. Note that the code may directly cause the processor to perform specified operations, be compiled to do so, and/or be combined with other software, hardware, and/or firmware elements (e.g., libraries for performing standard functions) to do so.

In this document, the terms "computer program product," "computer-readable medium," and the like may be used generally to refer to media such as, for example, memory 908, storage device 918, or storage unit 922. These and other forms of computer-readable media may be involved in storing one or more instructions for use by processor 904, to cause the processor to perform specified operations. Such instructions, generally referred to as "computer program code" (which may be grouped in the form of computer programs or other groupings), when executed, enable the computing system 900 to perform features or functions of embodiments of the present invention. Note that the code may directly cause the processor to perform specified operations, be compiled to do so, and/or be combined with other software, hardware, and/or firmware elements (e.g., libraries for performing standard functions) to do so.

In an embodiment where the elements are implemented using software, the software may be stored in a computer-readable medium and loaded into computing system 900 using, for example, removable storage drive 914, drive 912 or communications interface 924. The control logic (in this example, software instructions or computer program code), when executed by the processor 904, causes the processor 904 to perform the functions of the invention as described herein.

It will be appreciated that, for clarity purposes, the above description described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Although the present invention has been described in connection with some embodiments, it is not intended to be limited to the specific form set forth herein. Rather, the scope of the present invention is limited only by the claims. Additionally, although a feature may appear to be described in connection with particular embodiments, one skilled in the art would recognize that various features of the described embodiments may be combined in accordance with the invention.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather the feature may be equally applicable to other claim categories, as appropriate.

Moreover, it will be appreciated that various modifications and alterations may be made by those skilled in the art without departing from the spirit and scope of the invention.

The invention is not to be limited by the foregoing illustrative details, but is to be defined according to the claims.

Although only certain exemplary embodiments have been described in detail above, those skilled in the art will readily appreciate that many modifications are possible in the exemplary embodiments without materially departing from the novel teachings and advantages of this invention. Accordingly, all such modifications are intended to be included within the scope of this invention.

What is claimed is:

1. A method comprising:
receiving, by a computing device, a search category and a current query from a current user;
determining, by the computing device, relevance of documents comprising a corpus of documents relating to the search category;
obtaining, by the computing device, degree of interest data by users in one or more documents of the corpus of documents, the degree of interest data determined by a degree of interest data group including one or more of measuring how fast a user reads the one or more documents based on page scroll speed and average reading time based on length of the one or more documents, whether the user chose to cut and paste a portion of the document for further reading, whether the user bookmarked the one or more documents, or combinations thereof;
determining, by the computing device, documents comprising a search result and an order of the documents comprising the search result based on the determined relevance and obtained degree of interest data;
obtaining, by the computing device, direct search query terms from the users;
identifying, by the computing device, document query terms from content of the corpus of documents;
determining, by the computing device, query to query correlations from a query correlation data structure, where the determining of the query to query correlations comprises tracking query terms provided by the users in past search sessions which the users selected and where the query correlation data structure comprises, for each pair of the query terms, a measure selected from a group of measures consisting of a probability of co-occurrence in past user sessions and a degree of co-occurrence in a document of the corpus of documents;
determining, by the computing device, at least one query suggestion, the at least one query suggestion obtained from the direct search query terms, document query terms, and the query to query correlations;
tracking, by the computing device, (a) the search category and the current query specified by the current user, (b) interaction with each document clicked through from the documents comprising the search result, and (c) a query selected from the at least one query suggestion, to develop session history for both the users in the past search sessions and the current user; and
generating, by the computing device, a search results web page from the interaction with the each document and the documents comprising the search result, ordered in the determined order, the search result web page comprising the at least one query suggestion.

2. The method of claim 1, wherein identifying document query terms comprising natural language processing the corpus of documents to extract the document query terms.

3. The method of claim 1, wherein determining the relevance of the documents comprises determining statistic relevance based on the content of each of the documents.

4. The method of claim 1, wherein the search category comprises a product category.

5. The method of claim 1, wherein the search category comprises a question and answer category.

6. A system comprising:
a processor;
a storage medium for tangibly storing thereon program logic for execution by the processor, the stored program logic comprising:
query information logic executed by the processor for storing occurrence and frequency data relating to each of a plurality of query terms from search queries specified by a plurality of users and natural language processing of content of a corpus of documents;
query correlation logic executed by the processor for storing correlation data for each pair of the plurality of query terms from query term content in the content of the corpus of documents and degree of query term pairings specified by the plurality of users, where the query correlation logic stores, for each pair of the plurality of query terms, a measure selected from a group of measures consisting of a probability of co-occurrence in past user sessions and a degree of co-occurrence in a document of the corpus of documents;
interest obtaining logic executed by the processor for obtaining degree of interest data by the plurality of users in one or more documents of the corpus of documents, the degree of interest data determined by a degree of interest data group including one or more of measuring how fast a user reads the one or more documents based on page scroll speed and average reading time based on length of the one or more documents, whether the user chose to cut and paste a portion of the document for further reading, whether the user bookmarked the one or more documents, or combinations thereof;
determining logic executed by the processor for determining at least one query suggestion to provide with a search result, the at least one query suggestion obtained from the search queries specified by the plurality of users, the search queries from the natural language processing of the content, and the correlation data;
tracking logic executed by the processor for tracking (a) the search category and the current query specified by the current user, (b) interaction with each document clicked through from the documents comprising the search result, and (c) a query selected from the at least one query suggestion, to develop session history for both the users in the past search sessions and the current user; and
search results web page generating logic executed by the processor for generating a search results web page from the interaction with the each document the obtained degree of interest data, and the documents comprising the search result, ordered in the determined order, the search result web page comprising the at least one query suggestion.

7. The system of claim 6, wherein the query information logic is further configured to store, for each of the plurality of query terms, a number of occurrence of the respective query term in past user sessions, a number of occurrence of the respective query term in the corpus of documents, or a probability of occurrence of the respective query term in a recent time period of the past user sessions.

8. The system of claim 6, wherein the corpus of documents relates to documents associated with the search category.

9. The system of claim 6, further comprising a natural language processing engine operable to provide data for the query information logic and the query correlation logic.

10. A system comprising:
a processor;
a storage medium for tangibly storing thereon program logic for execution by the processor, the stored program logic comprising:
document identifying logic executed by the processor for identifying documents relating to a search category;
document analyzing logic executed by the processor for analyzing the documents to determine internal statistical content;
interestingness tracking logic executed by the processor for tracking users' interestingness data for the documents, where the tracking of the users' interestingness data comprises tracking user interaction with each document clicked through from a search result page, the tracking of the user interaction with each document comprising determining a user interaction data group including one or more of measuring how fast a user reads the each document based on page scroll speed and average reading time based on length of the each document, whether the user chose to cut and paste a portion of the document for further reading, whether the user bookmarked the each document, or combinations thereof;
first query term identifying logic executed by the processor for identifying first query terms from the documents;
second query term tracking logic executed by the processor for tracking second query terms specified by the users;
interest tracking logic executed by the processor for tracking users' indication of interest in pairs of query terms;
query suggestion tracking logic executed by the processor for tracking a query suggestion selected from a plurality of query suggestions and obtained from the first query terms, the second query terms, and the users' indication of interest in pairs of query terms;
search results web page generating logic executed by the processor for generating the search results page from the interaction with the each document and documents comprising a search result in the identified documents, ordered in a determined order, wherein the search results page comprises the plurality of query suggestions.

11. The system of claim 10, further comprising logic operable to combine the internal statistical content and users interestingness data to select documents of relevance and order of presentation of the selected documents in response to receiving the current query.

12. The system of claim 11, wherein a first weight is applied to the internal statistical content and a second weight is applied to the users' interestingness data.

13. The system of claim 10, wherein the first query terms are identified using natural language processing.

14. The system of claim 10, further comprising logic operable to provide a query database with the first query terms and the second query terms.

15. The system of claim 14, further comprising logic operable to generate at least one query suggestion from the query database in response to the current query.

16. The system of claim 10, further comprising logic operable to periodically update the documents relating to the search category.

17. The system of claim 10, wherein the users indication of interest in pairs of query terms is determined from tracking each of the second query terms specified by each of the users with the respective user's indication of interest in at least one query suggestion during the respective search session.

18. The system of claim 10, wherein the first and second query terms are different from each other.

19. The system of claim 10, wherein the second query terms comprise search terms used to initiate search sessions.

20. The system of claim 10, further comprising logic operable to determine a category for each of the second query terms, wherein the category can be the search category.

* * * * *